United States Patent [19]

Brown et al.

[11] Patent Number: 4,828,881

[45] Date of Patent: May 9, 1989

[54] PROCESS FOR PRODUCING SELF-ADHESIVE SHEET MATERIALS

[75] Inventors: Kenneth D. Brown, Tyne and Wear; Philip S. Arkell, Bedlington, both of England

[73] Assignee: The House of Mayfair Ltd., Cramlington, England

[21] Appl. No.: 53,352

[22] Filed: May 22, 1987

[30] Foreign Application Priority Data

May 23, 1986 [GB] United Kingdom ............... 8612696

[51] Int. Cl.$^4$ ............................................. B05D 5/10
[52] U.S. Cl. .............................. 427/208; 427/208.4; 428/40
[58] Field of Search ............... 427/208, 208.4; 428/40

[56] References Cited

U.S. PATENT DOCUMENTS 4,358,494 11/1982 Akimoto et al. ............... 427/208 X
4,617,199 10/1985 Galli et al. ............... 427/208

FOREIGN PATENT DOCUMENTS 1069998 5/1967 United Kingdom .
1241177 7/1971 United Kingdom .
1264795 2/1972 United Kingdom .
1315114 4/1973 United Kingdom .
1493407 11/1977 United Kingdom .
1511110 5/1978 United Kingdom .
2110956 6/1983 United Kingdom .
2117271 10/1983 United Kingdom .

*Primary Examiner*—Michael Lusignan
*Attorney, Agent, or Firm*—James E. Nilles; Donald C. McGaughey

[57] ABSTRACT

A sheet substrate is coated on one side with a pressure sensitive adhesive and to the other side is applied a curable material, usually a foamable material. The coated substrate is heated to a temperature of at least 140° C. to solidify the curable material and produce a profiled product in which the adhesive material retains its pressure sensitive adhesive properties. The curable material may be colored to produce a decorative effect and the product is useful as a wall covering or a decorative border for walls or ceilings or other use in interior decoration.

13 Claims, No Drawings

PROCESS FOR PRODUCING SELF-ADHESIVE SHEET MATERIALS

In GB No. 1264795 there are disclosed wall coverings which are intended to be reuseable. The substrates carry a permanently tacky pressure sensitive adhesive on one side and on the other a decorative surface with an outer release coating so that successive turns of the covering in a roll do not permanently adhere to each other. The substrate is paper and may be decorated by printing and embossing. In the process exemplified for producing the wall coverings the substrate paper is first printed and then coated with the release coat. The adhesive is subsequently applied to the other side of the substrate dried at a temperature of about 100° C. and the wall covering is rolled up. One problem with the product described is that only a limited three-dimensional effect may be achieved by embossing, the raised portions generally being a maximum of 1mm high. A further problem is that it is inconvenient to apply adhesive to any embossed substrate and any processes carried out especially on highly embossed paper web must be carried out on relatively short rolls of web for a given maximum diameter of roll.

In GB No. 1315114 self-adhesive wall coverings similar to those of GB No. 1264795 are disclosed but which are based on a substrate comprising a flexible thermoplastic resin material. The substrate generally comprises polyvinyl chloride film but may include a layer of, for instance, expanded polyethylene. Decoration is applied by printing or embossing. The process exemplified comprises applying polyvinyl chloride plastisol to a support web of paper, embossing the paper PVC laminate or applying a printed pattern to the PVC surface, applying a release coating over the printing and then applying an adhesive coat to the paper side of the laminate drying the adhesive at about 120° C. and rolling the web.

The problem with these products is that only a limited three-dimensional effect may be achieved by embossing, even when using a laminate including an expanded polyethylene layer. Any expanded polyolefin layer would have to be very thin, for example below 5 mm thick, to allow the laminate to be flexible. Embossing of such products generally produces profiling where the height of the raised portion is less than 1 mm. A laminate including expanded polyolefin would be formed at an early stage in the manufacturing process and subsequent processing would crush the expanded polyethylene and allow rolls of the material to comprise short lengths only. Coating an embossed web has the disadvantages mentioned above. The product of the process described ss always a laminate of PVC and paper or a non-woven so that the paper or non-woven being necessary to act as a support during printing or embossing. An unsupported PVC web could not be produced by an analogous process.

There are in commercial use narrow strips of decorated substrate used as friezes and decorative borders for walls and ceilings or application to furniture. Self-adhesive products based on paper and synthetic thermoplastics resins, sometimes containing a lamina of expanded polyolefin, are often decorated by printing using conventional solvent based inks which are dried at low temperatures and/or by mechanical embossing. Again a limited three-dimensional effect may be achieved in these products and printing and embossing require separate processing steps, with a separate drying step between them.

Wood and plaster mouldings are applied as decorations to walls, ceilings and furniture to give a three-dimensional effect. These products are expensive and difficult to apply. There are expanded polystyrene covings on the market most of which have smooth surfaces, but some of which have a moulded surface. They are also difficult to apply and, particularly if supplied with a pressure-sensitive adhesive coating, are hard to reposition without causing damage. These products are all rigid and so must be provided as elongate bodies. These are inconvenient to transport and their length is limited. Furthermore such products can, in general, be coloured only by hand-painting. This is laborious for the consumer, or, if done by te manufacturer, makes the product very expensive.

In a process according to the invention a substrate is coated on one side with a pressure sensitive adhesive material and a liquid curable material is applied to the other side of the substrate and the substrate is then heated at a temperature of at least 140° C. to solidify the curable material, to produce a profiled product in which the adhesive material retains its pressure sensitive adhesive properties.

In this invention a profiled product is one whose decorative surface is rendered uneven by the applied cured material. The profile depth is the distance from the most raised part of the lowest part of the decorative surface.

In the process the adhesive material may be applied to the substrate after the curable material but is preferably applied before the curable material. In both cases the adhesive is applied before the curing step.

The substrate used in the process may be a single material or a laminate of several layers. It may comprise paper, non-woven, woven or knitted fabrics and/or flexible plastic films and foils. A preferred substrate is a foil or film of a synthetic polymer, for example of a polyester, or, preferably of a thermoplastic resin such as a polyolefin or a vinyl polymer. A preferred substrate comprises a vinyl chloride polymer, for example a homopolymer of vinyl chloride. Such films or foils are advantageously supported during at least part of the process by laminating the film or foil to a support web in a conventional manner. The support web may be permanently laminated to the film and thus comprise part of the substrate and be retained in the product or it may be stripped from the product after part or all of the process. A release sheet as described above applied to an adhesive coating may act as the support web in the process of the invention. In a particularly preferred embodiment of the invention a commercially available self-adhesive thermoplastic resin film carrying a release sheet, for example sold under the trade marks "Fablon" or "Con-Tact", is printed with a curable material.

Preferably after the adhesive is coated onto the substrate a release sheet is applied to the adhesive coating. The release sheet protects the adhesive coating during subsequent processing of the substrate, preventing the adhesive from adhering to machinery. The release sheet further acts as a physical support for the substrate during the subsequent processing. This physical support is particularly of importance where the substrate consists of a thermoplastic polymer, e.g. a polyolefin, or polyvinyl material or a polyester. The release sheet may be applied temporarily during processing, for example it may be stripped from the adhesive coating after the final processing step to produce a final product which includes no release sheet. A temporary release sheet may be reused. Preferably, however, the release sheet is retained in the final product. The release sheet is generally a conventional sheet of paper carrying a release layer of silicone.

The curable material usually contains a polymer which is curable at the processing temperature. The polymer may be one which is cured by being cross-linked, e.g. to render a soluble polymer solid and insoluble in the liquid vehicle of the material, or may be in the form of a dispersion or plastisol in the curable material, which forms a continuous solid phase on heating. These types of materials give a limited profiled effect to the substrate. For example the material may comprise a plastisol of a vinyl polymer, generally a vinyl chloride polymer and preferably a homopolymer of vinyl chloride. A plastisol comprises plasticiser for example a phthalate-type plasticiser. Other suitable materials comprise water-based acrylic emulsion materials. The curable material optionally comprises conventional stabilisers, fire retardants, anti-oxidants, fillers, pigments, dyes, viscosity modifiers, etc.

Preferably the curable material is foamable, so that heating the substrate carrying the material causes it to foam. Using such materials a higher profiled effect may be achieved. Such foamable materials, generally comprise a basic curable material of the same type described above including the optional components together with a foaming agent. The foaming agent may be a chemical foaming agent or a physical foaming agent. Chemical foaming agents are widely used for forming floor covering compositions e.g. as in GB No. 1069998. A commercially available chemical foaming agent is for instance azodicarbonamide. Such agents are preferred for use in foamable plastisols. Physical foaming agents generally comprise micro-spheres of a thermoplastic material which contains a volatile liquid. On heating these micro-spheres the shell softens and the volatile material volatilises to expand the shell of the micro-spheres. The expanded thermoplastic shell hardens on cooling. Such foaming agents are preferred for use in water-based acrylic emulsion foamable materials.

The blow ratio of the foamable material, i.e. the ratio of the volumes before and after foaming, is chosen to give the desired softness and durability to the final product as well as the desired profile depth. Usually the blow ratio is between 1:2 and 1:20, preferably between 1:3 and 1:10.

The profile depth of the product is usually at least 1 mm, more often at least 2 mm and sometimes greater than 5 mm, for example up to 10 mm or even 15 mm, sometimes the profile depth of the product is as low as 0.1 mm, especially when the curable material is not foamable.

The curable material may be applied by conventional techniques at coating weights in the range 5 to 500 g/m$^2$, preferably 50 to 200 g/m$^2$, depending on print area and profile depth required. It is generally required that the material in the final product form a decorative pattern. The material may be applied discontinuously in the desired pattern for example by rotary screen printing. A foamable material may sometimes be applied over the whole surface of the substrate, for example by coating or printing a continuous layer. In either case further decorative features may be applied in known manner to a foamable material e.g. by the subsequent moulding of the foamed or unfoamed material. Preferably activators and/or inhibitors for chemical foaming agents in the foamable material may be applied over parts of the foamable coating for example as described in GB No. 1069998. Activators are for example potassium or zinc octoates. Inhibitors are for example trimellitic anhydride and benztriazole. The vehicles in which such activators or inhibitors may be contained may also act as decorative inks and thus may contain dyes and/or pigments to apply surface decoration to the final product.

A decorative surface may additionally, or alternatively, be provided by discontinuous printing of one or a plurality of differently coloured curable compositions onto the substrate, which may also be coloured. These methods produce "self-coloured" products which do not require further painting to give the desired coloured effects.

The decorated surface may have one or more top coatings, for example applied over the curable material e.g. before cring, so that the curing step also dries the coating. For example a transparent coating may be applied as a protective wear layer for the product. A top coat may alternatively or additionally act as a release coat for the pressure sensitive adhesive and may thus comprise a silicone compound. Such a release layer is advantageously included in the product when it is supplied without a separate release sheet over the adhesive layer so that, in a roll of the product web, successive turns of the web will not adhere permanently to each other.

The conditions in the curing step of the process depend on the nature of the curable material and any foaming agent, but is more than 140° C. Curing of a plastisol with or without a chemical foaming agent generally requires heating the coated substrate to a temperature of at least 150°, usually at least 180° and sometimes over 200° C. for a period of time greater than 20 seconds, usually less than 1 minute but sometimes more than 2 minutes and as much as 5 minutes, to cure and, if desired, foam the curable material. Water-based acrylic foamable materials are generally heated to a temperature in the range 140° C.-160° C., for example about 140° C. for a period of time in the range 1–60 secs.

Pressure sensitive adhesive are found to be able to withstand the conditions of temperature in the curing step whilst retaining their adhesive properties. Suitable adhesives are polyvinylether-based adhesives or, preferably, acrylic adhesives, for example based on acrylic esters, for example comprising units derived from one or more $C_{1-8}$-alkyl(meth)acrylate esters. Where the substrate is a plasticised polymer film it is sometimes found that the plasticiser migrates during the processing at raised temperatures, and may affect the adhesive, e.g. may soften it, which can be undesirable. When the substrate comprises plasticised polyvinyl chloride, the adhesive is preferably an acrylic-based adhesive.

These adhesives are conveniently applied as oil-in-water emulsions and applied by conventional techniques such as reverse roll coating. The adhesive should be applied in an amount such that the adhesive properties on a wall or article is sufficient for the product to be retained throughout its useful life, but should be such that on applying the product to the wall or other article the product may be pulled off and repositioned. Thus the cohesive strength of the substrate should be greater than the adhesive strength to the wall. The dry coating weight of adhesive is generally in the range 8–30 g/m:.

The width of the substrate web used in the process is generally the same width as used in conventional processes for producing wall coverings, for example about 1.12 m. After the foaming step the product web is cut to give the final product of the desired width and length, or stamped out to the desired shape.

It is highly surprising that in the process of the invention it is possible to pass an adhesive coated substrate through a relatively high temperature curing step to produce a final product in which the properties of the adhesive are retained. It is furthermore particularly surprising that in the preferred embodiment of the invention a polyvinyl chloride film carrying a layer of adhesive with a release sheet may be coated with a foamable material and passed through the foaming step with no harmful effect to the adhesive or the plasticised polyvinyl chloride film.

Although it might be expected that a similar product to that produced by the present invention could be made by a process analogous to that disclosed in GB No. 1264795 and GB No. 1315114, that is by coating a pressure sensitive adhesive onto a profiled, e.g. foamed product and optionally laminating a release paper to the adhesive coated surface, such a process would be unsatisfactory. The processing of pre-foamed products, particularly those with a relatively thick foam would crush the soft foam and lead to a large amount of damage and waste. Such crushing would take place during the adhesive coating and laminating stages and also in large reels of the material which would be necessarily be formed during the processing. Coating flat non-profiled sheets is much easier and gives a more even coating. Reels of the product used during processing would contain only short lengths of web especially where the products are highly profiled. Reel-to-reel joining would be difficult with such a product and for both these reasons there would be a large amount of waste and the process would be inefficient.

The process of the invention avoids these disadvantages and enables the production of decorative products having good three-dimensional properties. The process is advantageous for unfoamed cured material e.g. having profiled depths down to 0.1 mm although the most significant advantages are shown when foamed products are. produced for example having foam thicknesses of greater than 1 mm, preferably greater than 2 mm and often greater than 5 mm, up to 10 or even 15 mm. The product may be used as a wall covering, a decorative border for walls or ceilings, a ceiling decoration such as a ceiling rose, a frieze, covings, on picture rails and picture frames, as trim for furniture and many other uses. It is generally provided as a roll but, if it is very thick, for example 10 mm or above it may be provided as flat lengths or sheet of material, for example shaped sheets stamped from the web.

One preferred use of the product of the process of the invention is in the manufacture of a replacement for wood and plaster mouldings used on walls and ceilings. The foamed product of the process may be applied to commercially available coving e.g. of polystyrene, wood or plaster by adhering the product to a smooth surface of the coving. The resultant combination is a new product and forms part of the invention. The use on polystyrene coving is preferred for ease of use. Since the products may be self-coloured, the products are more decorative and do not require extra painting, compared to conventional covings.

The products of the process are particularly suitable as friezes, trim for furniture, picture rails and frames, decorative borders and covings especially when the profile depth is greater than about 5 mm. They are thus preferably provided as strips of less than 25 cm wide, usually less than 15 or 10 cm wide. Preferably the strip is at least 1 cm, preferably at least 5 cm wide. The strip may be provided as a roll if desired. The strip may also be adhered to the smooth surface of a coving as described above.

The following examples illustrate the invention:

EXAMPLE 1

A self-adhesive polyvinyl chloride film substrate containing 26 parts per hundred of resin phthalate ester plasticiser coated with 10–15 g/m$^2$ dry weight of a polyacrylic ester emulsion adhesive and laminated to a conventional release paper was printed with a polyvinyl chloride plastisol containing a chemical blowing agent comprising azodicarbonamide on a rotary screen printing machine. After printing the plastisol was cured and expanded in an oven in-line with the printing machine, at up to 200°–220° C. and at 30 metres per minute, the residence time in the oven being about 40 secs. Foamable materials having blow ratios in the range 1:3 to 1:10 have been made. To avoid reeling in large rolls which would contain relatively short lengths of web and risk crushing of the foam the expanded vinyl printed web was slit in-line to the desired width and wound up to the length desired of the finished product.

EXAMPLE 2

Example 1 was repeated but substituting as the substrate a fully strippable paper for the pvc film. Such paper in combination with the particular pressure sensitive adhesve still allows the final product to be repositioned on a wall without splitting of the paper due to the low tack properties of the adhesive and the internal strength of the paper.

We claim:

1. A process in which a sheet substrate is coated on one side with a pressure sensitive adhesive material and a liquid curable material is applied to the other side of the substrate and the substrate is then heated at a temperature of at least 140° C. to solidify the curable material to produce a profiled product in which the adhesive material retains its pressure sensitive adhesive properties.

2. Process according to claim 1 in which the curable material is a foamable material and the heating causes the material to foam.

3. A process according to claim 1 in which the adhesive material is applied to the substrate before the curable material is applied.

4. A process according to claim 1 in which the substrate comprises a plasticised polyvinyl chloride film.

5. A process according to claim 1 in which the adhesive coating of the substrate carries a release sheet during the heating step.

6. A process according to claim 1 in which the pressure sensitive adhesive is an acrylic adhesive.

7. A process according to claim 1 in which the profile depth of the product is at least 0.1 mm, preferably at least 1 mm.

8. Process according to claim 1 in which the curable material is coloured and provides decoration.

9. A process for producing self adhesive profiled sheet materials comprising the steps of:

(a) coating a sheet substrate on one side thereof with a pressure sensitive adhesive material,
(b) after said adhesive material has been applied, applying a liquid curable foamable material which will foam upon application of heat, to the other side of said substrate, and
(c) heating said coate substrate to a temperature of at least 140° C. to cause sid foamable material to foam and cure in a profiled state to produce a profiled product in which said adhesive material retains its pressure sensitive adhesive properties.

10. A process according to claim 9 comprising the further step of
(d) applying a release sheet to said adhesive coating prior to the appliction of said liquid curable material.

11. A process according to claim 9 comprising the further step of
(e) forming said profile during step (c) to a depth of at least 0.1 mm.

12. A process for producing self adhesive profiled sheet materials comprising the steps of:
(a) coating a plasticised polyvinyl chloride film on one side thereof with a pressure sensitive acrylic adhesive material,
(b) applying a liquid curable material to the other side of said film, and
(c) heating said coated film to a temperature of at least 140° C. to solidify the curable material to produce a profiled product in which said adhesive material retains its pressure sensitive adhesive properties.

13. A process according to claim 12 comprising the further step of
(d) forming said profile during step (c) to a depth of at least 0.1 mm.

* * * * *